Sept. 4, 1923.                    H. STOFFEL                    1,466,767
                                  BALL COCK
                             Filed June 30, 1920
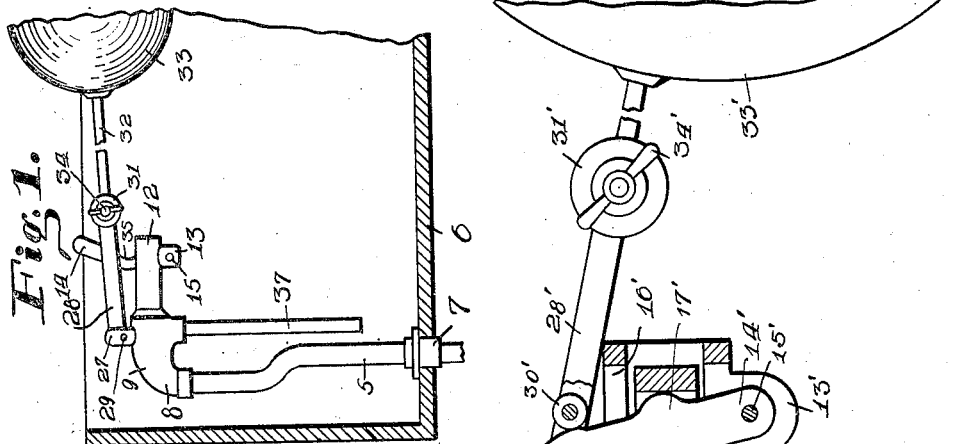
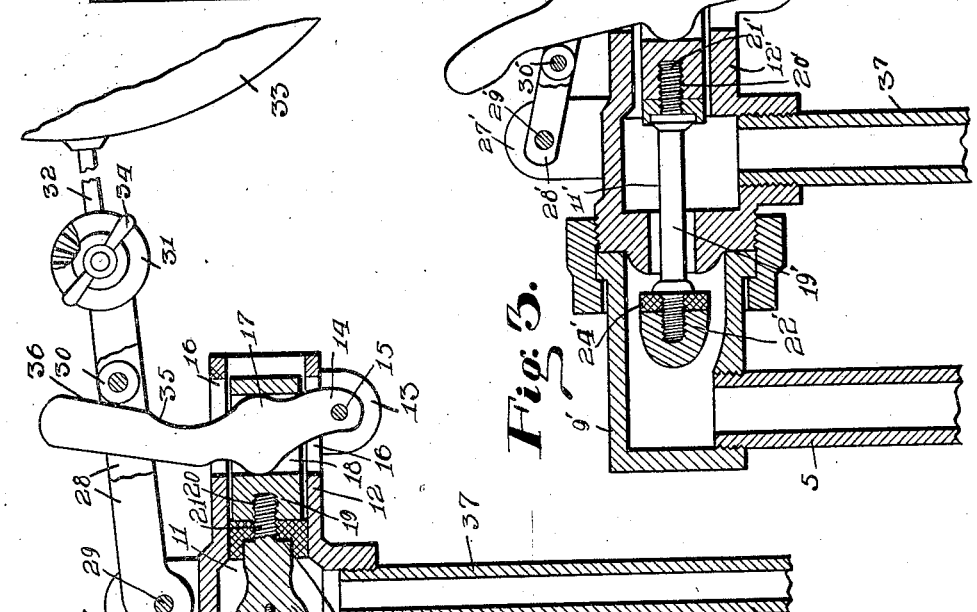
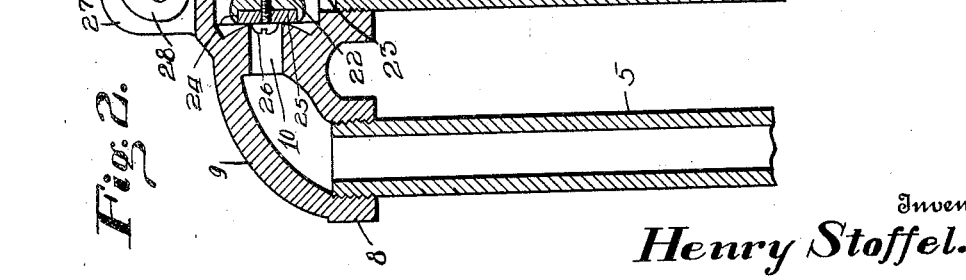
Inventor
Henry Stoffel.
By C.A. Snow & Co.
Attorneys Patented Sept. 4, 1923.

1,466,767

UNITED STATES PATENT OFFICE.

HENRY STOFFEL, OF TULSA, OKLAHOMA.

BALL COCK.

Application filed June 30, 1920. Serial No. 393,047.

*To all whom it may concern:*

Be it known that I, HENRY STOFFEL, a citizen of the United States, residing at Tulsa, in the county of Tulsa and State of Oklahoma, have invented a new and useful Ball Cock, of which the following is a specification.

This invention relates to an automatic valve adapted for use in connection with flush tanks or other receptacles in which it is desired to retain water at a predetermined level, and has for an object the provision of means for directly connecting the valve with the operating lever thereby eliminating intermediate levers and connecting links which produce objectionable noises in the usual devices of this character.

Another object of this invention is to provide an automatic valve which has its components so arranged as to permit relatively quick opening and closing of the said valve.

A further object of this invention is to provide an automatic valve of generally improved construction, whereby the device will be, simple, durable and inexpensive in construction, as well as convenient, practical, serviceable and efficient in its use.

With the above and other objects in view which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

The invention has been illustrated in its preferred embodiment in the accompanying drawings, herein:—

Figure 1 is an elevation of the device showing it applied to an ordinary flush tank;

Figure 2 is an enlarged vertical section taken through the valve proper; and

Figure 3 is a vertical sectional view of a modified form of the invention.

Referring to the drawings there is shown an inlet or supply pipe 5 which has its lower end secured to the bottom member of an ordinary flush tank 6 through the instrumentality of any preferred coupling or joint 7. The upper end of the supply pipe 5 is threaded to a branch 8 of a valve casing 9, which branch is connected through a port 10 with a chamber 11 formed within the casing. A tubular portion 12 extends from the casing 11 has an attaching ear 13 extending therefrom, which ear is pivotally secured to a lever 14, as indicated at 15, the lever 14 extends through diametrically opposed slots 16 formed in the tubular member 12 and has an enlarged portion 17 formed intermediate its ends which portion is disposed in a slot 18 formed in a plunger 19 that is slidably mounted within the tubular member 12. This plunger 19 has a threaded opening 20 formed in the inner end thereof for the reception of a threaded stem 21 which extends axially from the body portion of a valve 22, and a packing cup or ring is clamped between the inner end of the plunger 19 and a shoulder 23 formed on the valve 22. That end of the valve 22 which is remote from the stem 21 has a recess or socket 24 formed therein for the reception of a packing member or disk 25, which disk is rigidly secured to the valve 22 by means of a screw 26 or other securing device.

Attaching lugs 27 extend from the upper portion of the valve casing and have opposed arms 28 pivotally secured thereto, as indicated at 29 and the arms 28 have a roller 30 journaled intermediate their ends. This roller is positioned between the two arms and is adapted to cooperate with the lever 14 in order to open and close the valve 22 as will be hereinafter disclosed. The outer ends of the arms 28 have a serrated disk 31 rigidly secured thereto and this disk coacts with a similar disk in order to rigidly secure an arm 32 of a float 33 to the arms 28, the two disks being clamped together by a bolt or other securing devices 34. That end of the lever 14 which is positioned adjacent the roller 30 has a concaved portion 35 formed therein and a straight portion 36 extending from this concaved portion and a discharge or outlet pipe 37 extends from the chamber 11 of the valve casing and terminates at a point adjacent the bottom of the tank 6.

In use, when the fluid falls below a predetermined level within the tank 6 the roller 30 will ride off the straight face 36 of the lever 14 and move into the recess or concave portion 35 of this lever, thereby allowing the valve 22, plunger 19 and lever 14 to move away from the valve seat thus permitting the water to flow through the inlet pipe 5, branch 8, port 10, chamber 11, an outlet pipe 37 into the tank 6. As the level of the water within the tank rises the roller 30 will be held in the concave portion 35 of the lever 14 and remain there until considerable pressure is exerted on the arms 28 by the buoyancy of the float 33. However, when the fluid has reached a predetermined level the buoyancy of the float 33 will overcome the tendency of the concave portion 35 of the lever 14 to retain the roller 30 and cause the roller to ride upwardly to engage the straight surface 36 of this lever, thereby closing the valve and cutting off the supply of fluid.

This arrangement is obviously advantageous in that the valve lever 14 is directly connected with the valve operating means without interposition of links or levers of any kind thereby preventing the usual chattering or vibrations that occur in devices of this character. The peculiar formation of the lever 14 produces a relatively quick acting valve which is advantageous in valves of this type.

A slight modification of the device is illustrated in Figure 3 wherein, a casing 9' is shown having an inlet pipe 5 and an outlet pipe 37 communicating therewith. A valve 22' is operably connected to a lever 14' through the instrumentality of a valve stem and plunger 19'. Opposed arms 28' are pivotally secured to the valve casing and have rollers 30' journaled thereto, these rollers are adapted to cooperate with the lever 14' to open and close the valve 22'.

In operation as the float drops to its lower position the outer roller 30' engages the lever 14' and this lever in turn forces the valve 22' against the pressure of the fluid to its open position. As the rising fluid raises the float 33', the outer roller disengages the lever 14' and permits the fluid pressure to close the valve 22' and if the valve 22' does not move to its closed position under the influence of the fluid pressure then the continued upward movement of the float 33' will cause the inner roller 30' to engage the lever 14' and force the valve to closed position.

Having thus described the invention what is claimed is:—

An automatic valve including a valve casing having an inlet and an outlet, a valve seat formed within the casing and positioned between the inlet and outlet, a valve mounted to slide within the casing and positioned to cooperate with the valve seat to control communication between the inlet and outlet, said valve having a slot formed therein, an arm pivotally secured to the valve casing and operably connected to a float, a lever pivotally secured to the valve casing and having an enlargement which extends through and engages in said slot, said lever having a concave face and a straight face extending from the concave face, a roller journaled on the arm and adapted to engage the said straight face to move the valve towards the valve seat as the float is elevated and to cooperate with the concave face to permit the pressure of the fluid to quickly move the valve from the seat, said concave face tending to restrain the upward movement of the arm.

In testimony that I claim the foregoing as my own, I have hereto affixed my signature in the presence of two witnesses.

HENRY STOFFEL.

Witnesses:
 WM. D. GODFREY,
 MRS. CLARA HENDERSON.